United States Patent [19]

Washizuka et al.

[11] 4,190,329
[45] Feb. 26, 1980

[54] LIQUID CRYSTAL DISPLAY CELL OF THE REFLECTION TYPE

[75] Inventors: Isamu Washizuka, Kyoto; Satoshi Teramura, Kashihara; Shinji Tsugei, Yamatokoriyama; Kazuyoshi Hirayama, Kashihara, all of Japan

[73] Assignee: Sharp Kabushiki Kaisha, Osaka, Japan

[21] Appl. No.: 880,162

[22] Filed: Feb. 22, 1978

Related U.S. Application Data

[63] Continuation of Ser. No. 637,453, Dec. 3, 1975, abandoned.

[30] Foreign Application Priority Data

Dec. 3, 1974 [JP] Japan ................ 49-138974

[51] Int. Cl.² ................................. G02F 1/13
[52] U.S. Cl. ....................... 350/338; 350/336
[58] Field of Search ..................... 350/336, 338

[56] References Cited
U.S. PATENT DOCUMENTS 3,814,501  6/1974  Schindler ............... 350/338
4,012,119  3/1977  Adams et al. ............ 350/338

FOREIGN PATENT DOCUMENTS 2349592  4/1974  Fed. Rep. of Germany ........... 350/338

*Primary Examiner*—Edward S. Bauer
*Attorney, Agent, or Firm*—Birch, Stewart, Kolasch & Birch

[57] ABSTRACT

A liquid crystal display cell of the reflection type comprises a substrate on which reflection electrodes are formed, a transparent substrate on which transparent electrodes are formed and a liquid crystal composition filled between said two substrates. Activating voltage signals are applied between said two electrodes, thereby to drive the liquid crystal display cell to display desired symbols. A reflection film is formed on at least one of said two substrates in such a manner that the reflection film is electrically isolated from said reflection electrodes and the reflection film covers a position where the symbols are never displayed, or the reflection electrodes are not formed. The visibility of the information displayed on the liquid crystal cell can be enhanced because the reflection electrodes and the reflection film, in combination, cover the display panel uniformly.

5 Claims, 12 Drawing Figures

LIQUID CRYSTAL DISPLAY CELL OF THE REFLECTION TYPE

BACKGROUND AND SUMMARY OF THE INVENTION

This application is a continuation, of copending application Ser. No. 637,453, filed on Dec. 3, 1975.

The present invention relates to an improvement in a liquid crystal display cell of the reflection type.

In general, a liquid crystal display cell of the reflection type comprises a glass substrate on which reflection electrodes and lead wires thereof made of, for example, aluminum are formed through the use of etching technique, another glass substrate on which transparent electrodes and transparent lead wires thereof made of metal oxide such as tin oxide or indium oxide are formed through the use of etching technique, and a liquid crystal composition filled between said two glass substrates. The transparent electrodes are segment shaped to indicate desired symbols. The glass substrates are positioned with each other to confront the reflection electrodes with the segment shaped transparent electrodes.

When the liquid crystal display cell is driven in the dynamic scattering mode, to prevent erroneous display and enhance the visibility, the reflection electrodes and the lead wires of the reflection electrodes must be positioned not to confront the transparent lead wires connected to the segment shaped transparent electrodes, thereby to prevent undesirable scatter at the transparent lead wires. Therefore, the reflection electrodes are usually so constructed as to correspond to the respective transparent segment electrodes or to correspond to the areas outside therefor of the symbol pattern.

The attention of the operator is unavoidably placed on the symbol patterned or segment shaped reflection electrodes even at the positions being not selected for display. This results is that the quality of contrast of display is not satisfactory.

Accordingly, an object of the present invention is to enhance the visibility of the information displayed on a liquid crystal display cell of the reflection type.

Another object of the present invention is to provide a substantially uniform reflection means in a liquid crystal display cell of the reflection type.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objectives, pursuant to an embodiment of the present invention, a reflection film is formed on a substrate carrying transparent segment electrodes formed thereon in such a manner that the reflection film is electrically isolated from both said segment electrodes and lead wires thereof, and the reflection film covers an area where the segment electrodes are not formed, namely, an area where the lead wires are formed.

The reflection film cooperates with reflection electrodes to substantially uniform a reflection means, thereby enhancing the visibility.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
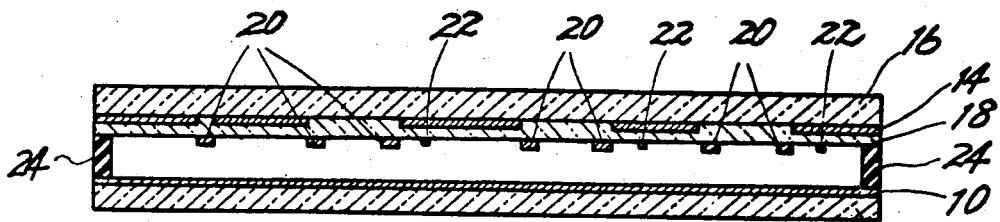
FIG. 1 is a sectional view of an embodiment of a liquid crystal display cell of the reflection type of the present invention.

Referring now to FIG. 1, there is illustrated an embodiment of the present invention, a uniform reflection electrode 10 made of, for example, aluminum is formed on a glass substrate 12 through the use of evaporation technique. A reflection film 14 made of, for example, aluminum is formed on a glass substrate 16 except in areas outside of the symbol patterns through the use of etching techniques. A transparent insulating layer 18 is uniformly formed on the glass substrate 16 and the reflection film 14 through the use of evaporation techniques. The transparent insulating layer 18 is made of, for example, silicon oxide or magnesium fluoride. Segment shaped transparent electrodes 20 and transparent lead wires 22 connected to the electrodes 20 are formed on the transparent insulating layer 18 through the use of etching technique. The segment shaped transparent electrodes 20 are formed at the areas where the reflection film 14 has been removed, whereas the transparent lead wires 22 are formed at positions behind the reflections film 14. The transparent electrodes 20 and lead wires 22 are made of metal oxide such as tin oxide. The glass substrate 16 is installed on the glass substrate 12 in such a manner to confront the segment electrodes 20 with the reflection electrode 10. Thereafter, a liquid crystal composition is filled between said two glass substrates 12 and 16 and then sealed through the one of spacers 24.

When the liquid crystal display cell of FIG. 1 is driven in the dynamic scattering mode, the respective segment electrodes 20 receive selection signals via the lead wires 22. With such an arrangement, the lead wires 22 also cause scattering, but the undesirable display corresponding to the lead wire 22 can not be seen by the operator since the reflection film 14 is formed in front of the positions where the lead wires 22 are formed. Additional spacers can be installed between said two substrates 12 and 16 behind the positions where the reflection film 14 is formed, thereby to stabilize the distance created between said two electrodes 10 and 20.

Figure 2:
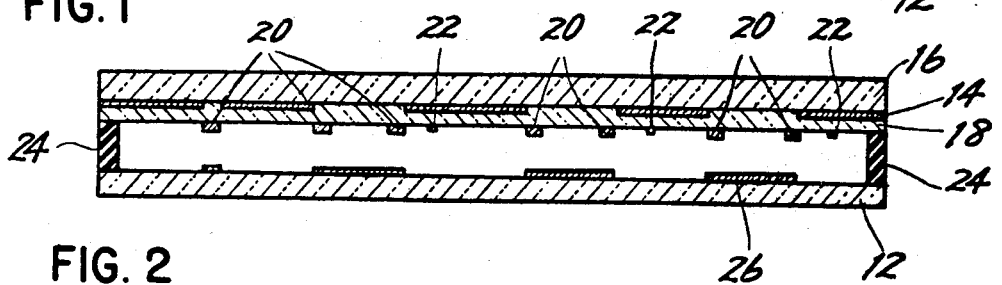
FIG. 2 is a sectional view of another embodiment of a liquid crystal display cell of the reflection type of the present invention.
Figure 3:
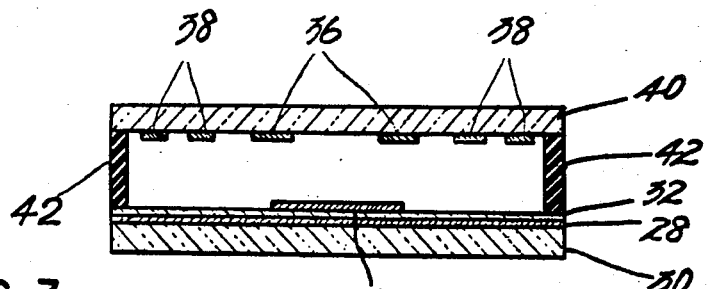
FIG. 3 is a sectional view of still another embodiment of a liquid crystal display cell of the reflection type of the present invention.
Figure 10:
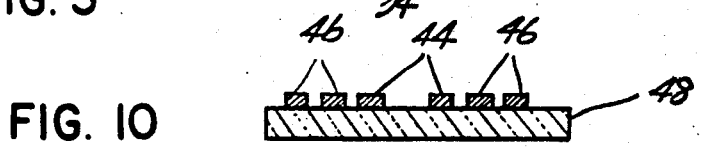
FIG. 10 is a cross sectional view as seen at X—X of FIG. 9.
Figure 9:
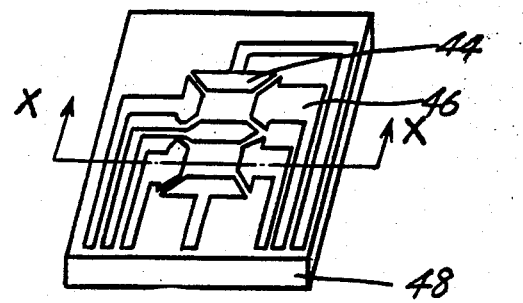
FIG. 9 is a perspective view of a substrate for use in the liquid crystal display cell of FIG. 8.
Figure 5:
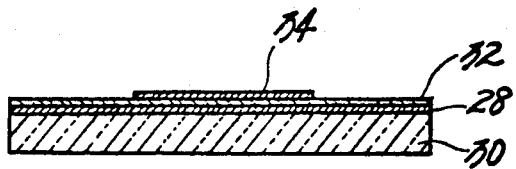
FIG. 5 is a cross sectional view as seen at V—V of FIG. 4.
Figure 4:
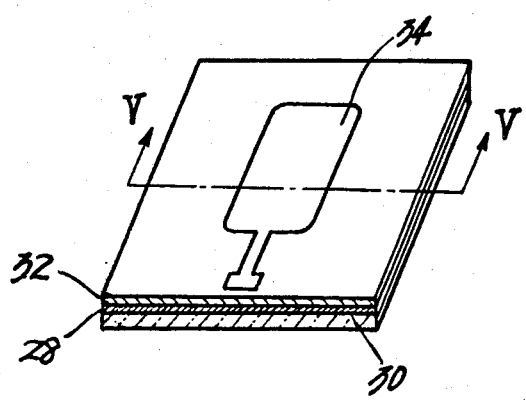
FIG. 4 is a perspective view of a substrate for use in the liquid crystal display cell of FIG. 3.
Figure 7:
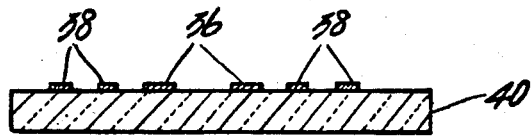
FIG. 7 is a cross sectional view as seen at VII—VII of FIG. 6.
Figure 6:
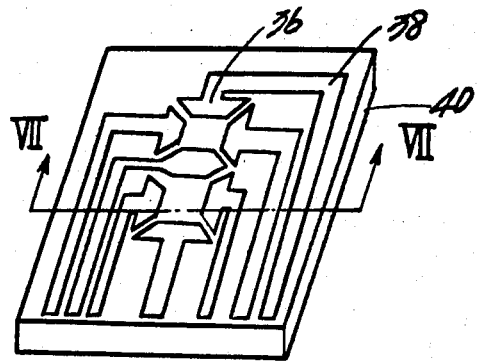
FIG. 6 is a perspective view of another substrate for use in the liquid crystal display cell of FIG. 3.
Figure 8:
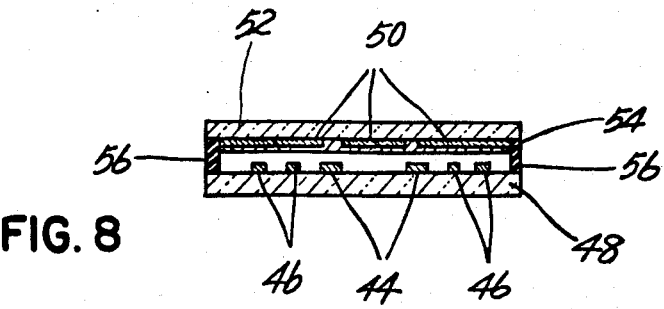
FIG. 8 is a sectional view of yet another embodiment of a liquid crystal display cell of the reflection type of the present invention.
Figure 12:
FIG. 12 is a cross sectional view as seen at XII—XII of FIG. 11.
Figure 11:
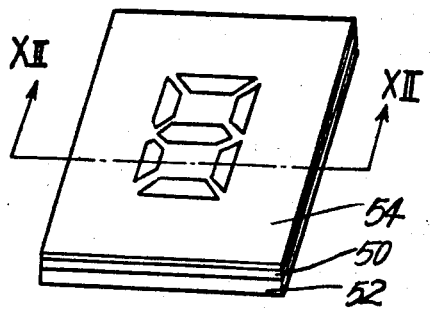
FIG. 11 is a perspective view of another substrate for use in the liquid crystal display cell of FIG. 8.

FIG. 2 shows another embodiment of the present invention. Like elements corresponding to those of FIG. 1 are indicated by like numerals. Reflection electrodes 26 formed on the glass substrate 12 are so constructed as to correspond to the areas surrounding the symbol pattern through the use of etching techniques. In this embodiment, undesirable current flow will not occur from the lead wires 22 to the opposing electrode, since the reflection electrodes 26 are not formed at the area corresponding to the lead wires 22. Therefore the power dissipation can be reduced. Alternatively, the reflection electrodes can be so constructed as to correspond to the respective segment electrodes 20.

FIGS. 3 through 7 show still another embodiment of the present invention. A reflection film 28 is uniformly formed on a glass substrate 30 through the use of an evaporation technique. A transparent insulating layer 32 made of, for example, silicon oxide is uniformly formed on the reflection film 28 through the use of an evaporation technique. Thereafter, a reflection electrode 34 is formed on the transparent insulating layer 32 to correspond to the areas surrounding the symbol patterns. The reflection film 28 and the reflection electrode 34 are made of, for example, aluminum. Transparent electrodes 36 and transparent lead wires 38 made of, for example, tin oxide are formed on another glass substrate 40 through the use of an etching technique. The transparent electrodes 36 are segment shaped to display symbols, whereas the transparent lead wires 38 are connected to the segment shaped electrodes 36, respectively, in order to supply the electrodes 36 with selection signals. The glass substrate 40 is installed on the glass substrate 30 via spacers 42 and, thereafter, a liquid crystal composition is filled therebetween. The segment shaped electrodes 36 confront the reflection electrode but not the lead wires 38. Thus, electrical current will not occur in the lead wires 38, thereby to prevent the unnecessary power dissipation.

FIGS. 8 through 12 show yet another embodiment of the present invention. Reflection electrodes 44 and lead wires 46 made of, for example, aluminum are formed on a rear glass substrate 48 through the use of an etching technique. The reflection electrodes 44 are segment shaped to display desired symbols, whereas the lead wires 46 are connected to the reflection electrodes 44, thereby to supply the reflection electrodes 44 with selection signals. A reflection film 50 made of, for example, aluminum is formed on the opposite front glass substrate 52. The reflection film 50 is removed at the positions which correspond to the segment shaped reflection electrodes 44 through the use of an etching technique. A transparent uniform electrode 54 made of, for example, indium oxide is formed on the reflection time 50 and the glass substrate 52. The glass substrate 52 is installed on the glass substrate 48 via spacers 56, between which a liquid crystal composition is filled and sealed. The segment shaped reflection electrodes 44 confront the areas where the reflection film 50 is removed, whereas the lead wires 46 confront the reflection film 50.

With such an arrangement, when a voltage signal is applied between the segment shaped reflection electrodes 44 and the common electrode 54, electric field intensity differs depending on the positions of the segment electrodes 44. That is, the field intensity is strongest at edges of the segment electrodes 44. When the segment electrodes are made of metal oxide, the edge portions thereof will be dissolved. But the segment electrodes 44 in the above described embodiment are made of metal, namely, aluminum and, therefore, the dissolution of the edge portions of the segment electrodes 44 can be substantially prevented. Moreover, the transparent common electrode 54 made of metal oxide has no edge portions and, therefore, the transparent electrode 54 will not be damaged. This results in enhancement of visibility and tolerance of the liquid crystal display cell to long periods of usage. Therefore, the liquid crystal cell of the last embodiment is suitable for a display system of, for example, an electronic digital clock.

Undesirable display such as from lead wires 46, will not be seen by the operator since the reflection film 50 is formed at the positions where the lead wires 46 are formed.

The reflection means becomes substantially uniform even when the reflection film is formed on the substrate on which transparent electrodes are formed, because the two substrates are spaced away from each other at a distance of about several tens of microns.

The invention being thus described, it will be obvious that the same way be varied in many ways. Such variations are not to be regarded as a departure from the spirit and scope of the invention, and all such modifications are intended to be included within the scope of the following claims.

What is claimed is:

1. A liquid crystal display cell of the reflection type comprising:
    a. a rear substrate;
    b. segment shaped reflection electrodes and lead wires thereof formed on the rear substrate;
    c. a transparent front substrate through which the display cell is viewed;
    d. a reflection film formed in direct surface engagement on the transparent substrate, the reflection film covering the area of said lead wires on said rear substrate, but being removed at the positions corresponding to the segment shaped reflection electrodes formed on the rear substrate;
    e. a transparent electrode formed uniformly over said transparent substrate and said reflection film directly engaging said transparent substrate only over that portion thereof from which said reflection film is removed;
    f. a spacer for providing a predetermined distance between said two substrates; and
    g. a liquid crystal composition filled between said two substrates; whereby said reflection film is viewed without intervention of said transparent electrode.

2. The liquid crystal display cell of claim 1, wherein the segment shaped reflection electrodes are made of aluminum.

3. The liquid crystal display cell of claim 1, wherein the transparent substrate is made of glass.

4. The liquid crystal display cell of claim 1, wherein the reflection film is made of aluminum and shaped through the use of etching techniques.

5. The liquid crystal display cell of claim 1, wherein the transparent electrode is made of indium oxide.

* * * * *